United States Patent [19]

Chasser et al.

[11] Patent Number: 4,861,833
[45] Date of Patent: Aug. 29, 1989

[54] EPOXIDE AND RUBBER BASED CURABLE COMPOSITIONS HAVING GOOD ADHESION DIRECT TO METAL

[75] Inventors: Anthony M. Chasser, Glenshaw; Joseph M. Makhlouf, Mars, both of Pa.

[73] Assignee: PPG Industries, Inc., Pittsburgh, Pa.

[21] Appl. No.: 101,700

[22] Filed: Sep. 28, 1987

[51] Int. Cl.$^4$ .............. C08L 9/02; C08L 9/06; C08L 63/02

[52] U.S. Cl. .................... 525/122; 525/118; 525/119

[58] Field of Search .......................... 525/122

[56] References Cited

U.S. PATENT DOCUMENTS

| | | | |
|---|---|---|---|
| 3,947,522 | 3/1976 | Shelley, Jr. et al. | 525/122 |
| 4,156,700 | 5/1979 | Tremblay et al. | 525/122 |
| 4,420,588 | 12/1983 | Yoshioka et al. | 525/122 |
| 4,501,853 | 2/1985 | Sugimori et al. | 525/122 |

FOREIGN PATENT DOCUMENTS 53-112950 10/1978 Japan.

OTHER PUBLICATIONS

Yamashita et al, "Vulcanization of 1-chlorobutadiene-butadiene Rubber with Diepoxy Compound", Department of Chemistry, Kyoto Institute of Technology, Nippon Gomu Kyokaishi, vol. 49, No. 6, 1976, pp. 514–519.

Japanese Patent Application Disclosure Number S53[1978]-112950, pubilished Oct. 2, 1978 by the Japanese Patent Office.

Yamashita, Kohjiya, Tamura, "Vulcanization of Carbon Black Loaded 1-chlorobutadiene-butadiene rubber with Diepoxy Compound", Department of Chemistry, Kyoto Institute of Technology, Matsugasaki, Sakyo-ku, Kyoto 606; Nippon Gomu Kyokaishi, vol. 49, No. 6, 1976, pp. 503–513.

Yamashita, Kohjiya, Tamura, Sando, "Vulcanization of 1-chlorobutadiene-butadiene Rubber with Diepoxy Compound", Department of Chemistry, Kyoto Institute of Technology, Sakyo-ku, Kyoto 606, Nippon Gomu Kyokaishi, vol. 49, No. 6, 1976, pp. 514–519.

Onishchenko, Zurina, Zamkovaya, Kutyanina (F. E. Dzerzhinskii DKhTI), "Interaction of Epoxy Resins With Nonpolar Rubbers", Kauch, No. 1, 1982, pp. 20–23.

Kutyanina, Zamkovaya, Onishchenko, Myagkova, Kotov, "Modivication with Epoxy Resins of Rubbers Based on Special Purpose [Raw] Materials", Proisv. Shin RTI i ATI, No. 6, 1981, p. 11–4.

*Primary Examiner*—John C. Bleutge
*Assistant Examiner*—Robert E. L. Sellers, II
*Attorney, Agent, or Firm*—Linda Pingitore

[57] ABSTRACT

A one package, stable curable composition contains:
(a) a nonfunctional polydiene;
(b) a polyepoxide;
(c) a sulfur and zinc containing vulcanization system adapted to cure the polydiene and the polyepoxide; and
(d) an anhydride containing material effective to promote adhesion of the curable composition to metal, wherein the anhydride containing material remains essentially unreacted with the epoxide and is combined in a manner to obtain dissolution of the anhydride containing material in the epoxide.

The aforesaid curable composition is suitable for use as an adhesive or sealant.

13 Claims, No Drawings

EPOXIDE AND RUBBER BASED CURABLE COMPOSITIONS HAVING GOOD ADHESION DIRECT TO METAL

CROSS REFERENCE TO RELATED APPLICATIONS

This application is related to Ser. No. 101,699, filed Sept. 28, 1987 entitled EPOXIDE AND RUBBER BASED CURABLE COMPOSITIONS.

BACKGROUND OF THE INVENTION

The present invention relates to curable compositions suitable for use as adhesives and sealants.

In the manufacture and assembly of automobiles, adhesives and sealants are used for a variety of different purposes. As a consequence, depending upon the mode of use, each adhesive or sealant has different physical properties requirements, such as a certain threshold lap shear strength at a particular temperature, a wide latitude of cure temperatures with the ability to cure both at very low and at very high temperatures, resiliency, good elongation and good adhesion to differing substrates.

Heretofore, because of the diversity and disparity in requirements, a different adhesive or sealant has been necessary for each of the different applications in automobile manufacture. For example, separate materials have been used as structural adhesives, as gap filling sealants, or as anti-flutter adhesives.

There is a need, therefore, for a single curable composition which can be used for a variety of different purposes and with the capability to meet all of the physical properties differing requirements.

SUMMARY OF THE INVENTION

In accordance with the present invention, there is provided a one-package, stable curable composition comprising:
(a) a nonfunctional polydiene;
(b) a polyepoxide;
(c) a sulfur and zinc containing vulcanization system adapted to cure the polydiene and the polyepoxide; and
(d) an anhydride containing material adapted to promote adhesion of the curable composition to metal, wherein the anhydride containing material remains essentially unreacted with the epoxide and is combined in a manner to obtain dissolution of the anhydride containing material in the epoxide. Also provided is a method of preparing an adhesive bond between two surfaces to form a bonded structure.

DETAILED DESCRIPTION OF THE INVENTION

The curable composition of the present invention comprises as one of its principal constituents a polydiene.

The polydiene polymers include polymers of 1,3-dienes containing from 4 to 12 and preferably from 4 to 6 carbon atoms. Typical dienes include 1,3-butadiene which is preferred, 2,3-dimethyl-1,3-butadiene, isoprene, chloroprene and piperylene. Also, copolymers of 1,3-butadiene and a monomer copolymerizable with 1,3-butadiene such as isopropene, acrylonitrile, and piperylene can be used. Other polymerizable monomers such as methyl methacrylate, acrylic acid, and styrene can also be used. Preferably the polydiene polymer is a mixture of 1,4-polybutadiene and a 1,4-polybutadiene acrylonitrile copolymer.

If desired, a variety of vulcanizable or non-vulcanizable synthetic rubbers can be used as inert fillers in conjunction with the polydiene. Examples of such synthetic rubbers include butyl rubber, ethylene propolyene terpolymer, silicone rubbers, polysulfides, polyacrylate rubbers and chlorinated polyethylene rubbers. Copolymers of many of the aforelisted synthetic rubbers with styrene can also be utilized.

It should be understood that the polydiene polymer of the present invention can be either functional or non-functional. In preferred embodiments, the polydiene polymer is non-functional, that is, it does not contain functional group such as, for example, hydroxyl, amino, carboxyl or mercapto.

Another principle constituent of the claimed curable compositions is a polyepoxide.

The polyepoxides are those materials having a 1,2 epoxide group present in the molecule. Hydroxyl groups may also be present and often are. A polyepoxide for the purposes of the present invention contains at least two 1,2-epoxy groups per molecule. In general, the epoxide equivalent weight can range from about 289 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A. More preferably the polyepoxide is a diglycidyl ether of bishphenol A.

Another class of polyepoxides are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl-2,2-propane.

Another class of polyepoxides are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinicaly unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Another class of polyepoxides consists of the epoxy novalac resins. These resins are obtained by reacting an epihalohydrin with the condensation product of aldehyde and monohydric or epichlorohydrin with a phenol formaldehyde condensate.

Another group of epoxide containing materials includes acrylic copolymers containing copolymerized glycidyl acrylate or methacrylate units. These acrylic copolymers can be prepared by the reaction of alkyl esters of alpha, beta unsaturated mono- or di-carboxylic acid with either glycidyl acrylate or methacrylate. Other glycidyl containing copolymerizable monomers such as diglycidyl itaconate and diglycidyl maleate also can be used. These monomers can be optionally copolymerized in the presence of other copolymerizable monomers such as vinyl aromatic compounds, such as styrenee or vinyl toleuene, and also acrylonitrile or methacrylonitrile.

Preferably the polyepoxide is a diepoxide. Preferably a polyglycidyl ether of bisphenol A is used, more preferably a diglycidyl ether. Examples of suitable materials are the EPON epoxy resins which are commercially availble from Shell Chemical, such as EPON 828.

It should be understood that mixtures of the aforedescribed polyepoxides can be used herein.

In preferred embodiments of the present invention an epoxy-rubber adduct is utilized as an additional additive in order to achieve optimum adhesion of the curable composition to oily metal. A preferred adduct is that which is prepared from an excess amount of the diglycidyl ether of bisphenol A, e.g., EPON 828 from Shell Chemical and a carboxyl terminated polybutadiene acrylonitrile copolymer, e.g., CTBN from B. F. Goodrich. The resultant epoxy functional adduct is free of carboxyl functionality.

A further principle constituent of the claimed curable composition is a sulfur and zinc containing vulcanization system which is adapted to cure the polydiene and the polyepoxide components.

As used in this specification, vulcanization is the physicochemical change resulting from crosslinking of the polydiene with sulfur, generally with application of heat. The precise mechanism which produces the network structure during the cure of the claimed compositions is still not completely known. However, it is theorized that a physical incorporation of the epoxide into the polydiene rubber lattice may be in effect. The vulcanization system comprises a material or mixture of material which is adapted to effect cure of the polydiene and the polyepoxide. Preferably the vulcanization system comprises a lower alkyl dithiocarbamate and a disulfide. A number of lower alkyl dithiocarbamates are useful herein, particularly those having from 1 to 10, preferably 1 to 5 carbon atoms in the alkyl portion. Examples of suitable dithiocarbamates include methyl, ethyl, propyl, butyl and amyl dithiocarbamate. Preferably the dibutyl dithiocarbamate is utilized herein. These materials are commercially available in association with zinc in salt form, namely zinc dibutyl dithiocarbamate, zinc dimethyl dithiocarbamate, zinc diethyl dithiocarbamate and zinc diamyl dithiocarbamate. These materials can be commercially obtained from Vanderbilt Chemical Company under the trade designation ZI-MATE.

The zinc which is part of the vulcanization system can be introduced in different ways. One example has been given above in connection with the vulcanization system; that is, the zinc can be associated with the lower alkyl dithiocarbamate in salt form. The zinc can also be introduced as zinc oxide. It should be understood that a variety of grades of zinc oxide are available and can be utilized for this purpose. The amount of zinc in the vulcanization system can vary widely, generally from about 0.1 percent by weight to about 10 percent by weight based on the total weight of the curable composition. The precise mechanism is not understood; however, it is believed that the zinc functions as an accelerator for the sulfur vulcanization.

The disulfide component of the vulcanization system can also be selected from a variety of materials. Examples of suitable disulfides include 4-morpholinyl-2-benzothiazole disulfide; 4,4'-dithiobismorpholine and benzothiazyl disulfide. Preferably the disulfide is benzothiazyl disulfide. It is believed that the dithiocarbamate and the disulfide components of the vulcanization system function as primary and secondary accelerators, respectively, for the vulcanization reaction. Moreover, in preferred embodiments of the present invention it is believed that the disulfide species functions as a retarder for premature vulcanization. It is believed that the thiocarbamate operates in conjunction with the sulfur in order to effect the crosslinked, cured system. It is also believed that the dithiocarbamate functions not only to assist in vulcanization of the rubber component of the composition but in addition functions to incorporate the epoxide component into the crosslinked network. As has been mentioned above, the precise mechanism for this is not understood.

A further principle constituent of the claimed curable compositions is an anhydride containing material which is adapted to promote adhesion of the curable composition to metal. A variety of carboxylic acid anhydrides are contemplated to be within the scope of the present invention so long as they are capable of promoting adhesion of the curable composition direct to metal. The anhydride containing material is preferably a carboxylic acid anhydride selected from the group consisting of maleic anhydride, itaconic anhydride and phthalic anhydride. Preferably when a carboxylic acid anhydride is utilized, maleic anhydride is utilized. If desired, mixtures of the aforesaid carboxylic anhydrides can be utilized. The anhydride containing material can also be anhydride adduct. That is, an adduct comprising the reaction product of a carboxylic acid anhydride which is adapted to promote adhesion of the curable composition to metal with an olefinically unsaturated material. Preferably the carboxylic anhydride which is adducted with the olefinically unsaturated material is one of the anhydrides listed above. More preferably, it is maleic anhydride.

Examples of adducts with olefinically unsaturated materials include adducts formed from an appropriate anhydride as defined above in for example "ene" type reactions and free radical initiated polymerizations. Examples of these include adducts formed from the free radical initiated polymerization of two moles of 1-octene or 1-diene with one mole of maleic anhydride; and "ene" adducts formed by heating a polydiene such as polybutadiene with maleic anhydride.

Preferably, the claimed curable compositions are prepared as a moisture free system. The presence of water is not preferred because it opens the anhydride ring structure and interferes with the desired cure. Therefore, dessicant materials are typically added in order to remove water from the system.

Moreover, preferably the carboxylic acid anhydride is pretreated by heating it in the presence of a diepoxide for a period of time of at least about five minutes at a temperature ranging from about 60° C. to about 150° C.

It has been observed that when this pretreatment is conducted the carboxylic acid anhydride remains essentially unreacted. The pretreatment is an apparent dissolution of anhydride in epoxide. This result has been confirmed by infrared spectroscopy, acid number determinations and gel permeation chromatography. It has been observed that the carboxylic acid anhydride provides optimum stability and also performance in promoting adhesion to metal when pretreated this way.

In preferred embodiments of the present invention, the claimed curable composition is essentially free of amino group containing materials. The presence of amine is not preferred because it detracts from the resiliency of the resultant cured composition.

The amounts of each of the constituents of the claimed curable composition can vary widely depending upon the particular properties desired in the curable composition. For example, by varying the amount of polyepoxide and dithiocarbamate which is utilized in the curable composition, one can tailor the hardness of the ultimate cured composition. The more polyepoxide and dithiocarbamate which is utilized, the harder and stronger the polydiene polyepoxide cured material becomes. Generally, the amount of polydiene which is utilized in the claimed curable composition can vary within the range of from about 2 percent by weight to about 80 percent by weight. Preferably, the amount of polydiene which is utilized varies from about 5 percent by weight to about 50 percent by weight, and more preferably from about 10 percent by weight to about 15 percent by weight. The amount of polyepoxide generally can vary within the range of from about 1 percent by weight to about 75 percent by weight, preferably from about 5 percent by weight to about 40 percent by weight, and more preferably from about 10 percent by weight to about 20 percent by weight, the percentages based on the total weight of the curable composition. The sulfur containing vulcanization system is utilized in amounts varying from about 0.5 to about 25 percent by weight based on the total weight of the curable composition.

In preferred embodiments the dithiocarbamate primary accelerator can be present in an amount ranging from about 0.1 percent by weight to about 7 percent by weight, preferably from about 0.5 percent by weight to about 3 percent by weight and more preferably from about 1 percent by weight to about 2 percent by weight. The disulfide secondary accelerator can be present in an amount ranging from about 0.2 percent by weight to about 14 percent by weight, preferably from about 1 percent by weight to about 6 percent by weight and more preferably from about 2 percent by weight to about 4 percent by weight. All the percentages are based on the total weight of the curable composition.

The amount of sulfur which is part of the vulcanization system can also vary widely. Generally the amount of sulfur varies from about 0.1 percent by weight to about 15 percent by weight, preferably from about 0.2 percent by weight to about 5 percent by weight and more preferably from about 0.5 percent by weight to 1.5 percent by weight, the percentages based on the total weight of the curable composition. The sulfur can be utilized in a variety of forms but typically it is elemental sulfur and it is used as a solid oil-treated powder. For example, suitable sources of sulfur for the vulcanization system are the CRYSTEX brand sulfurs which are commercially available from the Stauffer Chemical Company.

It should be understood that the accelerator materials discussed above can contribute a minor amount of the required sulfur in the vulcanization system.

The amount of anhydride containing material can also vary widely depending upon the particular choice of material.

When the anhydride containing material is an unreacted carboxylic acid anhydride the amount can vary generally from about 0.1 percent by weight to about 10 percent by weight, preferably from about 0.2 percent by weight to about 5 percent by weight and more preferably from about 0.3 percent by weight to about 1.5 percent by weight. When the anhydride containing material is an adduct of an appropriate anhydride and anolefinically unsaturated material, the amount of the adduct can vary from about 0.1 percent by weight to about 20 percent by weight, preferably from about 0.5 percent by weight to about 10 percent by weight and more preferably from about 4 percent by weight to about 8 percent by weight. All of the percentages enumerated above are based on the total weight of the curable composition.

The claimed curable compositions can comprise a variety of other optional additives in addition to the principle constituents which have been detailed above. Examples of additives include fillers such as calcium carbonate, stearic acid treated calcium carbonate, polybutadiene treated calcium carbonate, barium sulfate, calcium and magnesium oxide, carbon blacks, hydrocarbon tackifiers and various phthalate and adipate plasticizers and antioxidants. Examples of suitable antioxidants are butylated hydroxytoluene, butylated and styrenated phenols and cresols, alkylated quinones and hydroquinones and butylated hydroxy benzyl isocyanates.

The claimed one package, stable curable compositions have a very wide latitude of cure temperatures. The claimed curable compositions can be cured by baking at a temperature within the range of from about 220° F. to about 550° F. (104° C. to 288° C.) for a period of time ranging from about 10 minutes to about 60 minutes. Preferably, the claimed curable compositions are cured by baking within a temperature of from about 325° F. to about 400° F. (163° C. to 204° C.) in a period of time ranging from about 15 minutes to about 30 minutes. One very unexpected advantage of the claimed curable compositions is their ability to cure both at very high temperatures and at very low temperatures while achieving comparable physical properties at both extremes. This capability reduces problems associated with underbaking and overbaking and permits the tailoring of compositions to suit a variety of application conditions.

In addition, the claimed curable compositions have outstanding adhesion direct to metal, particularly to oily metal. Moreover, the claimed curable compositions are capable of adhering to a wide variety of other substrates such as aluminum, primed metal, plastic, wood, and other substrates. It is believed that the anhydride containing material is very important in achieving the adhesion of the claimed curable compositions direct to metal.

The claimed curable compositions can be applied by conventional means although typically they are applied by extrusion.

The claimed one package, stable curable compositions also demonstrate a wide variety of other advantageous properties such as solvent resistance, heat resistance, good elongation, resiliency, good lap shear strength at high temperatures and in addition they demonstrate good overall strength at ambient temperature. The claimed curable compositions also exhibit good cohesive failure. Also, they have excellent package stability for prolonged periods of up to three months.

The following examples are intended to be illustrative of the invention and are not intended to be limiting.

EXAMPLE I

This Example illustrates the preparation of a curable composition according to the claimed invention.

| Ingredients | Parts by Weight (grams) |
|---|---|
| HYCAR 1312 LV[1] | 12.85 |
| EPON 828[2] | 13.22 |
| MULTIFLEX SC[3] | 23.10 |
| butylated hydroxytoluene | 1.92 |
| butyl zimate[4] | 0.86 |
| ALTAX[5] | 1.72 |
| POLIOL 130[6] | 11.26 |
| calcium carbonate | 17.75 |
| calcium oxide | 5.17 |
| sulfur[7] | 1.72 |
| carbon black | 1.25 |
| plasticizer[8] | 0.96 |
| EPOXY-CTBN adduct[9] | 5.75 |
| IDMA/STEREON 840 A[10] | 1.00 |
| maleic anhydride[11] | 0.50 |

[1]This unsaturated resin is a butadiene-acrylonitrile copolymer which is commercially available from B. F. Goodrich.
[2]This epoxy resin is the diglycidyl ether of bisphenol A which is commerically available from Shell Chemical Company. It has an epoxy equivalent weight of 185 to 192.
[3]This is a stearic acid treated calcium carbonate which is commerically available from Pfizer.
[4]This is a zinc dibutyldithiocarbamate which is commerically available from R. T. Vanderbilt Chemical Co. R. T. Vanderbilt Chemical Co.
[5]This is benzothiazyl disulfide which is commercially available from R. T. Vanderbilt Chemical Co.
[6]This unsaturated resin is the polymerization product of 1,3-butadiene which is commerically available from Huls. The molecular weight is approximately 3,000.
[7]This is CRYSTEX OT-90 from Stauffer Chemical which is an oil treated powder having a 90 percent sulfur content.
[8]Diisododecyl phthalate plastizer.
[9]This epoxy resin is the reaction product of a carboxy terminated acrylonitrile-butadiene copolymer (commercially available from B. F. Goodrich) and EPON 828 in excess EPON 828.
[10]This is a dissolution product of 30 percent by weight STEREON 840A, a styrene-butadiene copolymer available from Firestone, in 70 percent isodecylmethacrylate. It was used as a flow additive.
[11]The maleic anhydride was heated for approximately one hour at 120° C. with EPON 828. It is demonstrated by IR, GPC and acid numbers, that the maleic anhydride in this solution is essentially unreacted.

The adhesive composition was prepared by combining the ingredients together with mild agitation. The compositions was tested for physical properties as follows.

Lap Shear Strength

Lap shear bonds for testing were prepared using two strips of cold rolled steel 1 inch×4 inches×0.062 inch (2.54 cm×10.16 cm×0.158 cm). A 118 mil (2.95 millimeters) thick film of a composition was applied onto one of the metal strips and then a second strip was placed over top of the first strip so that only a one-half square inch (3.16 square centimeter) strip overlapped. The composition was cured at 160° C. for 30 minutes, 190° C. for 30 minutes and at 205° C. for 120 minutes (three different bonds were prepared, one for each temperature). The lap shear strength of the bond in pounds per square inch (psi) (newtons per square millimeter) was determined according to ASTM D-1002-65. The data presented for each temperature was an average of three separate determinations. (The ends of the strips were pulled with an INSTROM TESTER device and the lap shear strength of the bond measured.)

Tensile Strength

A 0.100 inch (0.254 cm) thick layer of a composition was applied onto a TEFLON treated glass panel measuring 12 inches×12 inches×0.100 inch (30 cm×30 cm×0.254 cm). The composition was cured by baking at 190° C. for 30 minutes and then the panel was cooled to room temperature. The free films were prepared and evaluated for tensile strength according to ASTM D 638. Each value in psi (newtons per square millimeter) is an average of three separate determinations. The percent elongation was also determined according to this ASTM test.

Shore A Hardness

A 0.100 inch (0.254 cm) thick layer of a composition was applied onto a metal panel. The composition was cured by baking at 190° C. for 30 minutes and then cooled to room temperature. The Shore A hardness was determined using a Shore Durometer Hardness Type A-2 instrument according to ASTM D676.

T-peel Strength

The composition was evaluated for T-peel strength according to ASTM D1876. T-peel bonds for evaluation were prepared as follows. Two strips of cold rolled steel measuring 1 inch×6 inches×0.031 inch (2.54 centimeters×15.24 centimeters×0.079 centimeters) were used. A 118 mil (2.95 millimeters) thick film of adhesive composition was applied onto one of the metal strips and then a second metal strip was placed overtop the first strip so that a 4 square inch (25.81 square centimeter) section was bonded. Then the two ends of the panels which were not bonded were bent to form a T-shape. The load for the T-peel strength determination was applied at 5.0 inch (12.7 centimeters) per minute. The T-peel strength is measured in pounds per linear inch (lbs/in) (killinewtons per meter). The results are set out below:

| | |
|---|---|
| Lap Shear Strength at 190° C./30 min: | 410 psi (2.8 newtons/mm²) |
| Lap Shear Strength at 110° C./30 min: | 280 psi (1.9 newtons/mm²) |
| Lap Shear Strength at 205° C./120 min: | 360 psi (2.5 newtons/mm²) |
| T-peel Strength: | 38 psi (2.6 killinewtons/meter) |
| Tensile Strength: | 508 psi (3.5 newtons/mm²) |
| Elongation: | 180 percent |
| Shore A Hardness: | 68 |

| EXAMPLES II to VI (Parts by Weight in Grams) | | | | | |
|---|---|---|---|---|---|
| Ingredients | II | III | IV* | V | VI |
| HYCAR 1312 LV | 16.60 | 12.85 | 12.85 | 12.85 | 12.85 |
| EPON 828 | 15.22 | 13.22 | 13.22 | 13.22 | 13.22 |
| MULTIFLEX SC | 23.10 | 23.10 | 23.10 | 23.10 | 23.10 |
| butylated hydroxytoluene | 1.92 | 1.92 | 1.92 | 1.92 | 1.92 |
| butyl zimate | 0.86 | 0.86 | 0.86 | 0.86 | 0.86 |
| ALTAX | 1.72 | 1.72 | 1.72 | 1.72 | 1.72 |
| POLIOL 130 | 11.26 | 11.26 | 11.26 | 11.26 | 11.26 |
| calcium carbonate | 17.25 | 17.25 | 17.25 | 17.25 | 17.25 |
| calcium oxide | 5.17 | 5.17 | 5.17 | 5.17 | 5.17 |
| sulfur of footnote[7] | 1.72 | 1.72 | 1.72 | 1.72 | 1.72 |
| carbon black | 1.25 | 1.25 | 1.25 | 1.25 | 1.25 |
| plasticizer of footnote[8] | 0.96 | 0.96 | 0.96 | 0.96 | 0.96 |
| epoxy-CTBN adduct of footnote[9] | 0.00 | 5.75 | 5.75 | 0.00 | 5.75 |

-continued

EXAMPLES II to VI
(Parts by Weight in Grams)

| Ingredients | II | III | IV* | V | VI |
|---|---|---|---|---|---|
| IPDA/STEREON 840 A | 1.00 | 1.00 | 1.00 | 1.00 | 1.00 |
| maleic anhydride | 0.50 | 0.00 | 0.00 | 0.50 | 0.00 |
| phthalic anhydride | 0.00 | 0.00 | 4.00 | 0.00 | 0.00 |
| itaconic anhydride | 0.00 | 1.50 | 0.00 | 0.00 | 0.00 |
| dimer acid-epoxy adduct[12] | 0.00 | 0.00 | 0.00 | 5.75 | 0.00 |
| rosin-maleic anhydride adduct[13] | 0.00 | 0.00 | 0.00 | 0.00 | 2.00 |

[12]This epoxy resin is the reaction product of the dimer acid of rosin and EPON 828 in excess EPON 828.
[13]This Diels-Alder adduct was prepared by reacting 0.9 mole of maleic anhydride with 1 mole of rosin at 180° C. for 4 hours.
*Had less than two weeks package stability at room temperature.

Each of the adhesive compositions were prepared and evaluated as has been described above in Example I. Evaluations were done for lap shear strength, elongation and Shore A Hardness. The results appear below. The cure temperature was 190° C. for 30 minutes in Examples II to V.

| Example | Lap Shear Strength (psi) | (newtons/mm$^2$) | Elongation (percent) | Shore A Hardness |
|---|---|---|---|---|
| II | 366 | 2.54 | 60 | 64 |
| III | 210 | 1.46 | 180 | 65 |
| IV | 140 | 0.97 | 120 | 90 |
| V | 180 | 1.25 | 90 | 38 |
| VI | 215 | 1.49 | 100 | 70 |

What is claimed is:

1. A one package, stable curable composition comprising:
   (a) a nonfunctional polydiene;
   (b) a polyepoxide;
   (c) a vulcanization system comprising a sulfur containing material and a zinc containing material other than said sulfur containing material; and
   (d) an anhydride containing material adapted to promote adhesion of the curable composition to metal, wherein the vulcanization system cures the nonfunctional polydiene and polyepoxide, and the anhydride contaning material remains essentially unreacted with the epoxide and is retreated in a manner to obtain dissolution of the anhydride containing material in the epoxide.

2. The curable composition of claim 1 wherein the curable composition is essentially free of amino group containing material.

3. The curable composition of claim 1 wherein the curable composition is essentially moisture free.

4. The curable composition of claim 1 wherein the polydiene is 1,4-polybutadiene.

5. The curable composition of claim 1 wherein the polyepoxide is the diglycidyl ether of bisphenol A.

6. The curable composition of claim 1 wherein the sulfur and zinc containing vulcanization system comprises a lower alkyl dithiocarbamate and a disulfide.

7. The curable composition of claim 6 wherein the lower alkyl dithiocarbamate is zinc dibutyl dithiocarbamate and the disulfide is benzothiazyl disulfide.

8. The curable composition of claim 1 wherein the anhydride containing material is a carboxylic acid anhydride selected from maleic anhydride, itaconic anhydride, phthalic anhydride and mixtures thereof.

9. A one package, stable curable composition comprising:
   (a) a nonfunctional polydiene;
   (b) a polyepoxide;
   (c) a vulcanization system comprising a sulfur containing material and a zinc containing material other than said sulfur containing material, wherein said sulfur contaning material is a lower alkyl dithiocarbamate; and
   (d) a carboxylic acid anhydride adapted to promote adhesion of the curable composition to metal or an adduct of said anhydride with an olefinically unsaturated material wherein the vulcanization system cures the nonfunctional polydiene and polyepoxide, and the carboxylic acid anhydride or said adduct remains essentially unreacted with the epoxide and is pretreated in a manner to obtain dissolution of the anhydride containing material in the epoxide.

10. A one package, stable curable composition comprising:
    (a) a nonfunctional polydiene,
    (b) a diepoxide;
    (c) a vulcanization system comprising a sulfur containing material and a zinc containing material other than said sulfur containing material, wherein said sulfur containing material is benzothiazyl disulfide and said zinc containing material is a zinc lower alkyl dithiocarbamate; and
    (d) a carboxylic acid anhydride adapted to promote adhesion of the curable composition to metal selected from maleic anhydride, itaconic anhydride, phthalic anhydride, and mixtures thereof, wherein the vulcanization system cures the nonfunctional polydiene and diepoxide, and the carboxylic acid anhydride remains essentially unreacted with the epoxide and is pretreated in a manner to obtain dissolution of the anhydride containing material in the epoxide.

11. The curable composition of claim 10 wherein the lower alkyl dithiocarbamate is zinc dibutyl dithiocarbamate.

12. The curable composition of claim 10 wherein the anhydride is maleic anhydride.

13. The curable composition of claim 1 wherein: the polydiene is present in an amount ranging from about 2 percent by weight to about 80 percent by weight; the polyepoxide is present in an amount ranging from about 1 percent by weight to about 75 percent by weight; the sulfur containing vulcanization system is present in an amount ranging from about 0.5 to about 25 percent by weight; and the anhydride containing material is present in an amount ranging from about 0.1 percent by weight to about 10 percent by weight, the percentages based on the total weight of the composition.

* * * * *

UNITED STATES PATENT AND TRADEMARK OFFICE
CERTIFICATE OF CORRECTION

PATENT NO. : 4,861,833

DATED : August 29, 1989

INVENTOR(S) : Anthony M. Chasser and Joseph M. Makhlouf

It is certified that error appears in the above-identified patent and that said Letters Patent is hereby corrected as shown below:

In the Claims, column 9, line 47, "contaning" should read --containing--.

In the Claims, column 9, line 48, "retreated" should read --pretreated--.

In the Claims, column 10, line 15, "contaning" should read --containing--.

Signed and Sealed this

Twentieth Day of April, 1993

Attest:

MICHAEL K. KIRK

*Attesting Officer*  Acting Commissioner of Patents and Trademarks